(12) United States Patent
Zinke et al.

(10) Patent No.: US 12,072,227 B2
(45) Date of Patent: Aug. 27, 2024

(54) METHOD AND DEVICE FOR ZEROING A SCALE

(71) Applicant: Wipotec GmbH, Kaiserslautern (DE)

(72) Inventors: Bernd Zinke, Mandelbachtal (DE); Michael Rothfuchs, Bedesbach (DE)

(73) Assignee: Wipotec GmbH, Kaiserslautern (DE)

( * ) Notice: Subject to any disclaimer, the term of this patent is extended or adjusted under 35 U.S.C. 154(b) by 344 days.

(21) Appl. No.: 17/513,672

(22) Filed: Oct. 28, 2021

(65) Prior Publication Data

US 2022/0128394 A1 Apr. 28, 2022

(30) Foreign Application Priority Data

Oct. 28, 2020 (DE) .................. 102020128350.4

(51) Int. Cl.
| | |
|---|---|
| G01G 23/16 | (2006.01) |
| B65G 43/08 | (2006.01) |
| G01G 21/28 | (2006.01) |
| G01G 23/01 | (2006.01) |

(52) U.S. Cl.
CPC ............ G01G 23/16 (2013.01); B65G 43/08 (2013.01); G01G 21/28 (2013.01); B65G 2203/0233 (2013.01); B65G 2203/0258 (2013.01); G01G 23/01 (2013.01)

(58) Field of Classification Search
CPC ........ G01G 23/01; G01G 23/16; G01G 21/28; G01G 11/00; B65G 43/08; B65G 2203/0233; B65G 2203/0258
See application file for complete search history.

(56) References Cited

U.S. PATENT DOCUMENTS

| | | | | |
|---|---|---|---|---|
| 3,984,667 A | * | 10/1976 | Loshbough ............ | G06Q 30/04 |
| | | | | 177/25.15 |
| 4,139,069 A | | 2/1979 | Domis | |
| 4,392,535 A | | 7/1983 | Fujii et al. | |
| 4,709,770 A | * | 12/1987 | Kohashi ............... | G01G 23/163 |
| | | | | 177/185 |
| 4,890,441 A | | 1/1990 | Meerkatz et al. | |
| 5,230,391 A | * | 7/1993 | Murata .................. | G01G 11/00 |
| | | | | 177/50 |
| 5,308,930 A | * | 5/1994 | Tokutu ................. | G01G 11/046 |
| | | | | 177/164 |
| 5,635,679 A | * | 6/1997 | Kohashi ................ | G01G 19/035 |
| | | | | 73/1.13 |
| 6,373,001 B1 | | 4/2002 | Kono | |
| 6,861,592 B2 | * | 3/2005 | Gerstenberg ..... | G07B 17/00661 |
| | | | | 177/1 |
| 7,586,049 B2 | * | 9/2009 | Wurz ..................... | G01G 11/00 |
| | | | | 702/155 |
| 9,146,146 B2 | * | 9/2015 | Laird ..................... | G01G 19/00 |
| 10,094,702 B2 | * | 10/2018 | Laird ................... | G01G 19/035 |
| 2016/0123794 A1 | | 5/2016 | Toohey | |

* cited by examiner

*Primary Examiner* — Randy W Gibson
(74) *Attorney, Agent, or Firm* — The Culbertson Group, P.C.

(57) ABSTRACT

A method and a scale for the performance thereof performs a zeroing process as soon as a product conveyed across a weighing platform leaves the weighing platform.

17 Claims, 1 Drawing Sheet

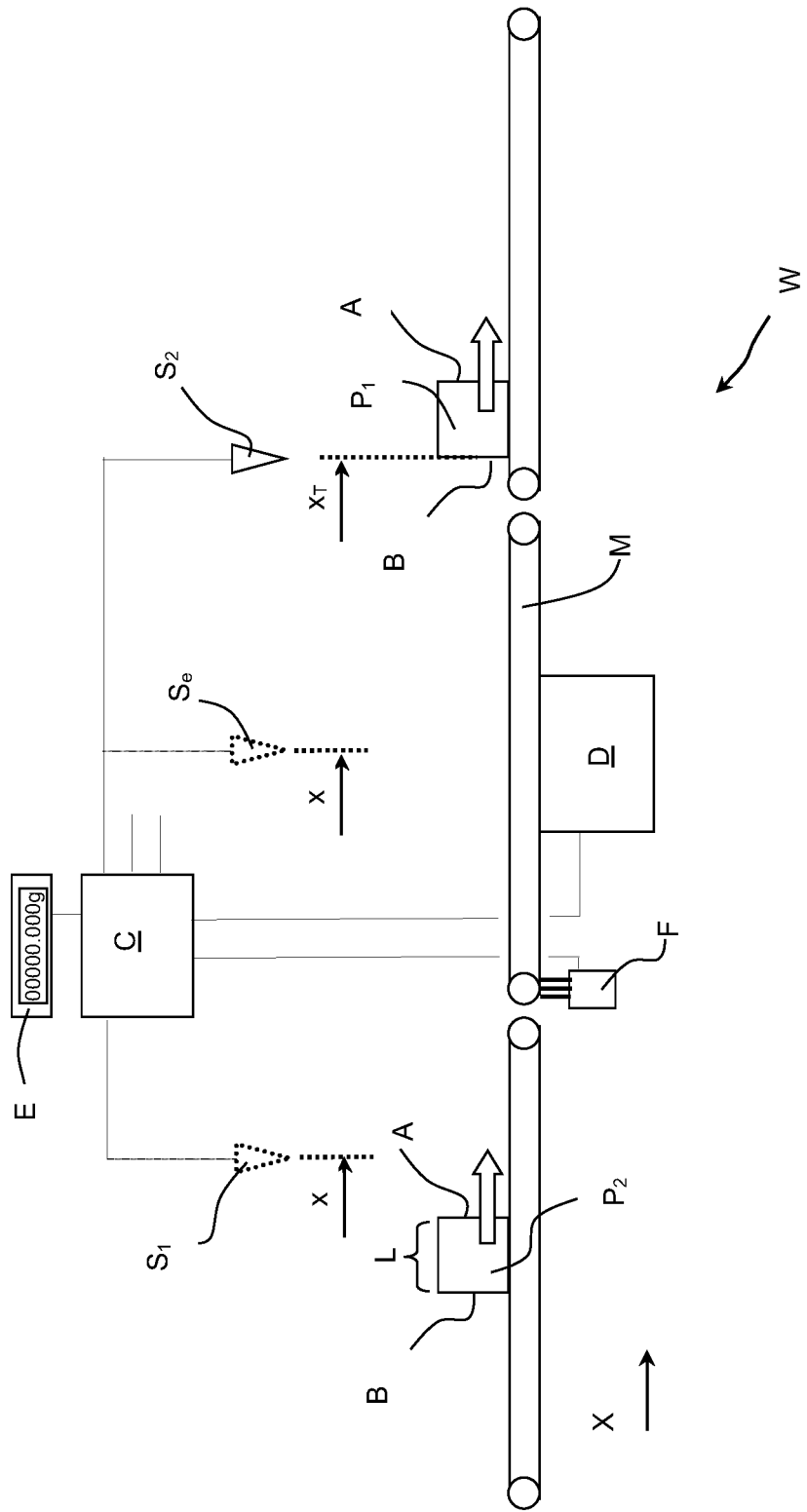

METHOD AND DEVICE FOR ZEROING A SCALE

TECHNICAL FIELD OF THE INVENTION

The present invention relates to a method and a device for zeroing a scale, the scale comprising a weighing platform supported by a load cell. According to the method, individual products are fed to a weighing platform to determine their weight. They are then discharged from the weighing platform. Each product is weighed in a weighing cycle. Weighing cycles of consecutively conveyed products can follow one another directly or be spaced apart by other process steps.

BACKGROUND OF THE INVENTION

The zero point, i.e., the value displayed without a load being applied to the weighing platform, is of great importance for the measuring accuracy of a scale. If the zero point of a scale is not defined precisely enough or is subject to an excessively large error, then, for example, a value other than zero will be displayed without a load resting on the weighing platform, or the value zero will be output despite a load resting on the platform (the term "weighing platform," as used in this disclosure and the accompanying claims, is also intended to include the receiving means of below-balance scales, where the loads to be weighed are suspended from this receiving means and the associated load cell is usually located above the receiving means).

Therefore, it is necessary to readjust the zero point ("zeroing" or "zeroing process") when certain criteria for doing so occur. For automatic scales, this can be done automatically at specific intervals, for example every 15 minutes. Alternatively or additionally, the number of individual weighing operations performed can also be a criterion for the requirement of zeroing. A detected deviation of the display value from an expected nominal value beyond specifiable tolerances can also be such a criterion (display deviates from zero by more than 0.5 calibration values in the unloaded state, for example).

When zeroing, a distinction can be made between a zeroing function, which is the subject of the invention described and claimed herein, and a zero-tracking function. With the zero-tracking function, the zero point is continually corrected (tracked) in a continuous program loop. For calibrated scales, there are legal regulations according to which a correction of, for example, a maximum of half a calibration value per second (tracking speed) is permissible for the zero-tracking function. This parameter prevents a relatively strong tracking adjustment of the zero point within a short time or a few steps. In addition, it is only permissible for the zero point to change by a maximum of four percent of the weighing range of the scale. Due to the limited tracking speed, however, this maximum value cannot be reached immediately, but at most within the permitted parameter, which keeps the risk of an incorrectly determined new zero point low.

This zero-tracking function is different with the zeroing function. In a zeroing function, the legal specifications permit a change of the zero point by up to 4% of the weighing range even within a single correction step. A typical application for the zeroing function concerns the case where, for example, loose bulk material escapes from a package to be weighed and remains on the weighing platform. This shortfall must be fully taken into account immediately for the subsequent container in the subsequent weighing cycle. A single zeroing function (within the permissible zero change of 4%, for example) is sufficient for this, so that weighing can be carried out immediately afterwards with a new zero point that may have been significantly changed. The zero-tracking function, on the other hand, does not allow this due to the limitation of the tracking speed and would not be able to operate.

It would be particularly advantageous if a zeroing function could be performed before each individual weighing operation. For this purpose, the signal from a light barrier located upstream of the weighing platform could be used as activation for the automatic zeroing function. When a product to be weighed reaches this light barrier, the zeroing function is triggered. For the product, the zero point defined immediately before the weighing cycle is particularly accurate. However, the zeroing function requires a certain amount of time, usually several 100 milliseconds. Until this time has elapsed, the product must not reach and load the weighing platform of the scale, i.e., there must be a correspondingly sufficient distance between the sensor and the weighing platform, which depends in particular on the conveyor speed.

At the same time, the gap between two successive products must be large enough to ensure that the subsequent product does not trigger a zeroing function before the zeroing function triggered by the preceding product has been successfully completed. For products that follow one another quickly—for example, when the conveying speed is increased—the time window (gap) remaining between two products may be too small for a complete zeroing function and can only be created by disadvantageously reducing the conveying speed or the product throughput. The distance between two successive products could occasionally be deliberately increased by deliberately creating a sufficiently large gap in the product flow. However, the sensor (and an associated control system) can only "recognize" the arrival of the gap as such upstream of the scale after the otherwise usual time interval between two regularly successive products has been exceeded, so that the time that has already elapsed by then cannot be used for the zeroing function. To avoid this, the point in time when the gap encounters the scale must be calculated in advance. This point in time can only be sufficiently accurately determined, however, if the gap position and conveyance speed upstream of the weighing platform are known and are also not changed for different products. Sometimes the operator changes the production facility but also the position of the scale along the conveyance path through the production process, and therefore valuable production time is consumed for re-parameterizing and release tests of the system after every change of the scale position.

For a zeroing function which is to be initiated by a sensor positioned upstream of the weighing platform, the creation of the "gap" also does not solve the problem that, depending on the conveyance speed, it is possible that the distance between the upstream sensor and the weighing platform may be too short to conclude a zeroing function triggered by the sensor successfully and on time.

SUMMARY OF THE INVENTION

The problem addressed by the invention is that of providing methods and devices for improving the automatic zeroing of an automatic scale simply and more reliably, because it is more independent of external influences.

In methods and devices according to the present invention, a zeroing function is preferably automatically triggered when a product leaves the weighing platform. According to methods and devices embodying aspects of the present invention, it is initially fictitiously assumed that a significantly large time window in the product stream for zeroing results every time a product has left the weighing platform at the end of the weighing cycle. Under this assumption, the zeroing function can be initiated automatically at the end of each weighing cycle. Unlike the case when the arrival of the product at a position upstream of the weighing platform is used as the signal for initiating the zeroing function, the arrival of the product at the downstream target position directly marks the beginning of the time window or the point in time at which the weighing platform is unloaded, so that the zeroing function can also be initiated immediately. When using the upstream sensor on the other hand, the zeroing function is only triggered when a subsequent product is already approaching the weighing platform and reaches the upstream sensor in the process.

The time between the moment at which a preceding product leaves the weighing platform and the moment at which the subsequent product reaches the upstream sensor can therefore be fully used for the zeroing function by the process control according to the invention.

Unlike a zero-tracking function, which typically takes place continually in successive cycles and does so without a physical event triggering each cycle, the zeroing function according to aspects of the invention is an independent, event-triggered, automatic function which is executed during the normal operation of the scale. According to aspects of the invention, the triggering event is provided in this case by the departure of the most recently conveyed, more particularly weighed, product from the weighing platform, and the weighing platform is free from discrete products to be conveyed.

A method according to the invention makes it possible to "capture" the gap suitable for performing a zeroing function securely and time-optimized. This takes place independently of a possibly changed arrangement of the scale along the production path in the system, because the size and the arrival of the gap at the weighing platform need not be determined by a higher-level system controller and transmitted to the scale controller. Instead, this can either be performed within the scale or can even be omitted completely if a downstream sensor is used for triggering the zeroing function. A scale in accordance with the present invention thereby becomes autonomous with respect to the zeroing function.

It is further provided according to aspects of the invention that the zeroing function is automatically canceled and discarded if a subsequent product reaches the weighing platform before the zeroing function has been successfully concluded. For this purpose, a sensor arranged upstream of the weighing platform, or the weighing signal of the load cell itself, can be evaluated for example.

However, the load cell (or the weight-related weighing signal thereof) is not suitable for detecting that the product has left the weighing platform in order to trigger the zeroing function. The reason for this is that the weighing signal will continue to oscillate for some time after a product has left the weighing platform, so that a defined signal for leaving the weighing platform can only be generated with insufficient accuracy from the weighing signal.

According to aspects of the invention, a zeroing function is started by each product leaving the weighing platform if the weighing platform is not loaded by further discrete products at that moment (that is, further discrete products to be included in a subsequent weighing cycle as will be discussed further below). If a subsequent product reaches the weighing platform before the zeroing function has been successfully completed, the zeroing function currently being executed is canceled and discarded, and therefore no new zero point is set or defined in this case (as used in this disclosure and the accompanying claims, a zeroing function is "successful" if a new zero point has been defined). As soon as this subsequent product in turn leaves the weighing platform, a zeroing function is triggered again. If, on the other hand, two successive products have a sufficiently large distance (gap) between them that corresponds to a sufficiently large time window for a complete zeroing function, then this time window can be used completely or from the beginning, namely, when the front product leaves the weighing platform.

Within the meaning of the present invention, the weighing platform is considered to be "free from discrete products to be conveyed" if there are no such products on the weighing platform that are destined to leave the weighing platform during regular operation—for example, within or at the conclusion of a weighing cycle—such as by being conveyed off the weighing platform. Under idealized operating conditions, it can be assumed that only the discrete products to be weighed are conveyed up onto the weighing platform and then conveyed down from it. A zeroing function can be executed whenever none of the products to be weighed and conveyed away are loading the weighing platform.

This also applies to products to be conveyed further for which the weight may deviate significantly from that of other products to be conveyed, and for example, is on the order of only a few calibration values of the scale. Since such a product is also conveyed back down from the weighing platform during regular operation, its (low) weight must not be offset as a result of an inadvertent zeroing function against the weight values of the products to be subsequently weighed. To ensure that even such (light) products have left the weighing platform before the start of each zeroing function, embodiments according to the present invention may use image recognition means or other suitable sensors to monitor the movement of the products onto and off of the weighing platform.

However, this does not preclude the platform from experiencing a weight force even when the discrete products actually being weighed and conveyed are not resting on it. For example, the discrete products could be bags of cement. If residues of loose cement from the bags get onto the weighing platform and remain there, this falsifies the measured weight value of the subsequently weighed cement bags that are conveyed further. A zeroing function (during which only cement residues remain on the weighing platform according to the present example) on the other hand, ensures that subsequently only the weight of the cement sack that is actually placed on the platform is weighed, while the cement residues remaining on the platform unchanged are no longer detected. Thereby a production stop for cleaning purposes can advantageously be avoided.

Methods according to aspects of the invention are to be carried out whenever a product has left the weighing platform (preferably after it has been previously weighed). The triggering of the zeroing function is also advantageously coupled directly to a weighing cycle or a component thereof. It is automatically initiated at the conclusion of each weighing cycle, preferably as soon as the weighing platform is no longer loaded by a discrete product to be conveyed. Thereby the time available until the arrival of the subsequent product at the weighing platform is optimally used for the zeroing function process.

This triggering of the zeroing function at the conclusion of a weighing cycle may be achieved with the aid of a specifiable target position ($x_T$) downstream of the weighing platform and by ascertaining the point in time at which the product reaches this target position. The position of the product along the conveying path at which the product has left the weighing platform may be selected as the target position. This state is preferably recognized as quickly as possible in order to be able to use valuable time for the zeroing function. The target position is therefore preferably as close as possible behind the downstream end of the weighing platform. It must also be taken into consideration how the arrival of the product at the target position is to be determined, and therefore the target position can be defined or determined in different manners.

It is initially presumed that a product to be weighed has a front end, as viewed in the conveying direction, as the leading edge and a rear end as the trailing edge. The leading edge is therefore to be understood as that portion of the product (tip, edge, end face, etc.) which protrudes farthest in the conveying direction and during conveyance is the first to reach or leave the weighing platform. The trailing edge is accordingly formed by that portion of the product which is farthest at the rear in the conveying direction and is the last to reach or leave the weighing platform for example. Whenever the trailing edge of a product has left the weighing platform it can be assumed that the weighing platform is initially unloaded and ready in principle for a zeroing function.

In particular, a leading edge or a trailing edge can be readily detected by a light barrier, which is preferably oriented transversely to the conveying direction. Such a light barrier as a sensor can detect whether a leading edge reaches the sensor or a trailing edge leaves the sensor (light barrier is interrupted or released). For nonuniformly shaped products, multiple sensors can also be provided in order to securely detect an edge of the product. In place of light barriers, other types of position detection familiar in the art can also be used.

The target position ($x_T$) may define the position downstream of the weighing platform at which either the leading edge or the trailing edge of the product is sufficiently far from the weighing platform that the product has certainly left the weighing platform. If the leading edge reaches the target position, then the product has completely left the weighing platform if the target position was established at least a distance of one product length downstream of the weighing platform. If the rear trailing edge reaches the target position, it is immediately clear that the product must have left the weighing platform.

The reaching of the target position can thus be detected with the aid of a sensor, where this sensor need not necessarily be arranged at the target position. The sensor can be situated directly at the target position or at any other desired sensor position (x) upstream of the target position depending on which edge is detected and evaluated in order to determine the point in time T.

a) A sensor arranged upstream of the target position (for example at a sensor position upstream of or alongside the weighing platform) can detect whether a leading edge is reaching the sensor or a trailing edge is leaving the sensor. If the trailing edge is detected and evaluated by the sensor, the time at which the trailing edge reaches the target position downstream of the weighing platform and the weighing platform is ready for the zeroing function can be calculated with knowledge of the conveying speed. On the other hand, if the leading edge is detected and evaluated by the sensor, then the conveying speed as well as the product length in the conveying direction must be taken into account in order to determine the point in time at which the trailing edge will have left the weighing platform.

b) The at least one sensor may be arranged directly at the target position ($x_T$) established downstream of the weighing platform or is adjusted such that it detects the arrival of a leading edge or trailing edge at the target position. If the sensor is provided for detecting and evaluating the leading edge of the product, for example, and if the target position is at least one product length (and thus sufficiently far) from the weighing platform, the detected arrival of the leading edge at the target position can be used directly to initiate the zeroing function. If the target position is closer to the weighing platform, it is then possible, by taking into account the conveying speed and the product length, to calculate the time at which the product will have left the weighing platform in order to then initiate the zeroing function.

The sensor arranged at the target position is most preferably used to detect and analyze the trailing edge of the product. In this case, neither the conveying speed nor the product length plays a part in triggering the zeroing function, and therefore the signal from the sensor can be directly used for triggering the zeroing function without considering additional parameters (and the necessary storage and detection thereof). This variant is thus particularly suitable for production processes in which products with varying lengths are processed or are processed at conveying speeds that are changed or even reduced to zero (start-stop operation).

c) According to a further embodiment of the invention, the sensor could also be arranged at a sensor position downstream of the target position and detect the arrival of the leading edge there (detecting the trailing edge at this point would unnecessarily delay the beginning of the zeroing function). To accomplish this, the distance between the sensor and the target position, the product length and the conveying speed must be known in order to be able to determine that the target position has been reached by the trailing edge of the product.

Methods according to the invention can also be used for differential weighing. In this method, a series of products to be weighed are successively fed to the weighing platform and discharged therefrom in the same order over the course of a single weighing cycle, wherein multiple products can also be situated simultaneously on the weighing platform for that weighing cycle. The weight of a given product in this series then follows from the difference of the loading of the weighing platform before and after the respective product has reached or left the weighing platform.

The description below discusses individual discrete products which are successively fed to the weighing platform or discharged therefrom, the platform only ever being loaded with one product. To explain the invention for differential weighing, it is only necessary to replace the single discrete product conceptually with the series of products which are supplied for differential weighing using the platform. In this case, a "product" in keeping with the invention reaches or leaves a sensor or the weighing platform for the given weighing cycle whenever the first or last product from the series reaches or leaves the respective sensor or the weighing platform. The weighing cycle in this case encompasses weighing each product of a set of more than one product and the entire series of products making up such a set of products may be thought of as a discrete product in keeping with the present invention.

Embodiments of the invention may provide that a sensor is arranged upstream of the weighing platform in order to terminate an already running zeroing function. Such a sensor is designed to detect the leading edge or the trailing edge of a product to be conveyed to the weighing platform in order to prematurely cancel a previously started zeroing function on the basis thereof (taking into account the conveying speed and/or the product length and/or the length of the gap if necessary). This ensures that a zeroing function which is still running is not concluded while a subsequent product would load the weighing platform or is already loading it and thereby would influence the measurement value, which assumes a non-loaded weighing platform for the display value "zero."

A sensor arranged upstream of the weighing platform can alternatively or additionally also be used to determine the point in time T in order to be able to trigger a zeroing function as described above. According to some embodiments of the invention, the reaching of an upstream sensor can also be provided for triggering a zeroing function which is performed in addition to the zeroing function triggered by the product leaving the weighing platform according to the invention. This combination has the effect that initially each product reaching the upstream sensor can trigger a zeroing function if the time in which the product is conveyed from this sensor to the weighing platform is sufficient for the zeroing function (and under the condition that the weighing platform is not loaded during the zeroing function in keeping with the above definition). When the product then leaves the weighing platform, it may trigger a zeroing function. In this way said product triggers the zeroing function twice, specifically when the product is detected before or during the approach to the weighing platform, and when it leaves the weighing platform.

If the gap between this product and the subsequent product is large enough, this zeroing function will also terminate successfully, otherwise it will not. According to specifiable criteria, which can be stored in a controller in the form of parameters for example, it can then be determined which of the two zeroing functions (or which of the two zero points determined thereby) will be the basis for the further operation of the scale.

According some embodiments of the invention, the cancellation of a zero-tracking function can be used to initiate a zeroing function if the product has left the weighing platform and the weighing platform is not loaded by another product. This ensures that at least one zeroing mode is activated during the scale operation. Switching back from the "zeroing function" mode to the "zero-tracking function" mode can be performed or tested after a specifiable period of time. Then, according to other embodiments of the invention, a continually repeated zero-tracking function can run in a load cell of the scale while the event-triggered zeroing function runs in a control unit formed separately from the load cell. This temporally relieves the program execution in the control unit.

A scale according to another aspect of the invention is designed to perform the above-described method. It comprises a weighing platform and a conveying system for conveying products downstream from the weighing platform. The scale may also be designed to receive the products upstream of the weighing platform and convey them onto the weighing platform. The scale includes at least one sensor which is designed to determine whether a product has left the weighing platform in order, depending thereon, to trigger the zeroing function. The sensor may be designed to detect the leading edge and/or trailing edge of a product conveyed by the scale, and the signal of the sensor may be used for determining the point in time at which the product reaches the specifiable target position ($x_T$) downstream of the weighing platform. The scale is expediently designed to perform the zeroing function.

A scale according to the invention may also include a control unit to which the signals of the at least one sensor can be supplied and which is designed to perform a zeroing function. The control unit can also be provided to control a drive with which the products are conveyed. The control unit may also include a memory in which operating parameters are stored temporarily or permanently and can be retrieved if necessary. These operating parameters can include the length of the products in the conveying direction, as well as the conveying speed, which can also be detected by means of an encoder and transmitted in signal form to the control unit. The control unit may be designed for wired or wireless signal transmission to other data processing devices, which can include a higher-level control unit, a display device, a data memory or a printer.

A sensor arranged in particular upstream of the weighing platform can advantageously be used to switch on and switch off automatic zero tracking. As described above, a continuous correction of the zero point in small increments is performed in a zero-tracking function. In order to detect the zero point, no product may be present on the weighing platform. It would in principle be possible to determine this state by evaluating the weight signal issued by the weighing cell (weight trigger). The problematic aspect in this case is that products having a very low weight (one calibration value 1e for example), could fall below the defined threshold value at which they would still be interpreted by the scale controller as a product. As a result, the low weight of the unrecognized product would be used incorrectly and unnoticed to form the new zero point. For a package scale having a calibration value e=50 g, for example, a letter weighing 20 g would not be recognized as a product.

Embodiments of the present application may therefore include methods and devices in which a sensor arranged in particular upstream of the weighing platform, is used to deactivate a zero-tracking function no later than when a product reaches the weighing platform. The check of whether a product is loading or will load the weighing platform, and therefore the zero-tracking function must be deactivated, is not performed by evaluating the weight signal, but rather by using other physical means, which detect the presence of the product independently of the weight thereof, more particularly by optical or haptic means. This ensures that every product (even one with very low weight) is securely detected and can be taken into account for controlling the zero-tracking function. This activation or deactivation of the zero-tracking function with the aid of a sensor arranged upstream of the weighing platform could also run independently of an event-triggered zeroing function according to aspects of the present invention.

As described under point a) above, the upstream sensor can detect a leading edge or a trailing edge of the product, for example. With knowledge of the conveying speed (detecting the leading edge) or additionally with knowledge of the product length in the conveying direction (detecting the trailing edge), the point in time at which the product reaches the weighing platform can be calculated, so that a running zero-tracking function can be deactivated no later than at that time. The automatic zero-tracking function can be reactivated after such a cancellation (analogously to the zeroing function), for example, after it has been determined by suitable means described above primarily for the zeroing function (such as a further sensor arranged downstream of the weighing plate) that no product is acting on the weighing platform.

The sensors mentioned in the present application can be sensors operating without contact (in particular light barriers, image recognition means, x-ray systems, magnetic systems or inductive and capacitive sensors) or also sensors functioning by contact (in particular sensors acted on by the product).

These and other advantages and features of the invention will be apparent from the following description of representative embodiments, considered along with the accompanying drawings.

BRIEF DESCRIPTION OF THE DRAWING

The FIGURE comprises a schematic side view of a scale embodying principles of the present invention.

DESCRIPTION OF REPRESENTATIVE EMBODIMENTS

The FIGURE shows a schematic side view of a scale W according to the invention, which is incorporated in the production of individual products $P_1$, $P_2$. To determine the weight of the products $P_1$ and $P_2$, they are fed one by one to the scale at an upstream end in a conveying direction X (from left to right in the FIGURE) and discharged after the weighing process at a downstream end. The conveying devices necessary for the scale W upstream and downstream are only suggested in the FIGURE and not identified in further detail.

The scale W includes a weighing platform M which is supported on a load cell D. The weighing platform M is configured as a belt conveyor and can be driven via a motor F. With the aid of the weighing platform M, the individual products such as product $P_2$ can be conveyed across the weighing platform M in order for its weight to be detected by means of the load cell D in the process.

The products to be weighed have a leading edge A at the front end thereof viewed in the conveying direction, and a trailing edge B at the rear end. The product length L therefore corresponds to the distance between leading edge A and trailing edge B as viewed in conveying direction X. Downstream of the weighing platform M, a sensor $S_2$ is arranged at a target position $x_T$ in order to detect the trailing edge B (in this illustrated example) of the product $P_1$ conveyed downstream from the platform M. The sensor $S_2$ is preferably a light barrier. A control unit C is provided for detecting the signals transmitted by the sensor $S_2$. The control unit C is also connected to the load cell D and the motor F as well as to an encoder, not shown, and additionally controls the output of a weight value on a display E as well as zeroing functions. Alternatively, the sensor can be connected directly to the load cell D and the zeroing function can run directly in the load cell, particularly an intelligent or digital load cell having a suitable processing device.

A method according to the invention may run as follows:

A product $P_1$ conveyed by the weighing platform leaves the weighing platform M after completion of the weighing cycle performed by scale W for that product. The trailing edge B thereof thus reaches the target position $x_T$, which is detected by the sensor $S_2$ and signaled to the control unit C. Because the weighing platform M is not loaded at this time (a sufficiently large distance between successive products $P_1$, $P_2$ is initially assumed in this case), the control unit C can trigger a zeroing function in order to set the display value associated with a non-loaded weighing platform M to "zero." The zeroing function is preferably terminated before the subsequent product $P_2$ reaches the weighing platform M. This subsequent product $P_2$ can then be weighed. A further zeroing function can be started whenever the trailing edge B of the subsequent product $P_2$ reaches the target position $x_T$ downstream of the weighing platform M.

Methods according to the invention permit the use of the time available between two successive products ("gap") for a zeroing function immediately starting from the point in time at which the front product has left the weighing platform or an edge (A or B) thereof has reached a target position $x_T$, which represents this state (that is, the state at which the front product has left the weighing platform). The zeroing function can then begin immediately (if necessary, an additional time buffer can be provided in order to wait for and ensure the settling of the weighing platform M or of the load cell D in the non-loaded state).

In order to determine the arrival of a product (more precisely: the arrival of the leading edge A or the trailing edge B thereof) at the target position, it is not necessary to arrange a sensor provided for this purpose at the target position $x_T$. For this purpose, it is instead possible to evaluate a sensor $S_1$ provided upstream of the weighing platform, or a sensor $S_e$ arranged alongside the weighing platform M, which sensor is connected to the control unit. Even with such a sensor, the time T at which the trailing edge B of the product will have left the weighing platform M can be determined in order to start the zeroing function. For example, a sensor $S_1$ arranged upstream of the weighing platform at a sensor position x can be provided to detect the leading edge A of a product P, for example. Starting from this moment, the time required for the trailing edge B of the product to have left the weighing platform results from the distance between the sensor position x and the target position $x_T$, the conveying speed, the product length L and optionally a conveying pause in case the product is to be weighed at a reduced speed or while immobile.

At the same time or alternatively, the sensor $S_1$ could also be used to cancel and disregard a still-running zeroing function or zero-tracking function if a subsequent product has prematurely reached the weighing platform or the sensor $S_1$. Specifically, it is conceivable and even probable that the distance between two successive products frequently will not suffice to be able to carry out a zeroing function therebetween. If the arrival of a subsequent product $P_2$ at the sensor position x upstream of the weighing platform M is not detected by this sensor $S_1$ upstream of the weighing platform M while a zeroing function triggered by a preceding product $P_1$ is still running, the process can be canceled. In this case, the subsequent product $P_2$ is weighed, without a zeroing function having been successfully carried out for the previous product. The invention is thus based on the deliberate acceptance of a high cancellation rate in return for securely "capturing" every sufficiently long gap.

As used herein, whether in the above description or the following claims, the terms "comprising," "including," "carrying," "having," "containing," "involving," and the like are to be understood to be open-ended, that is, to mean including but not limited to. Also, it should be understood that the terms "about," "substantially," and like terms used herein when referring to a dimension or characteristic of a component indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Any use of ordinal terms such as "first," "second," "third," etc., in the following claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term). Rather than using an ordinal term to distinguish between commonly named elements, a particular one of a number of elements may be called out in the following claims as a "respective one" of the elements and thereafter referred to as "that respective one" of the elements.

The term "each" may be used in the following claims for convenience in describing characteristics or features of multiple elements, and any such use of the term "each" is in the inclusive sense unless specifically stated otherwise. For example, if a claim defines two or more elements as "each" having a characteristic or feature, the use of the term "each" is not intended to exclude from the claim scope a situation having a third one of the elements which does not have the defined characteristic or feature.

The above-described preferred embodiments are intended to illustrate the principles of the invention, but not to limit the scope of the invention. Various other embodiments and modifications to these preferred embodiments may be made by those skilled in the art without departing from the scope of the present invention. For example, in some instances, one or more features disclosed in connection with one embodiment can be used alone or in combination with one or more features of one or more other embodiments. More generally, the various features described herein may be used in any working combination.

REFERENCE CHARACTERS

A Leading edge
B Trailing edge
C Control unit
D Load cell
E Display
F Motor
L Product length
M Weighing platform
$P_1$, $P_2$ Product
$S_1$ Sensor
$S_2$ Sensor
$S_e$ Sensor alongside the weighing platform
T Point in time
W Scale
X Conveying direction
x Sensor position
$x_T$ Target position

The invention claimed is:

1. A method for automatic zeroing of a scale, the scale comprising a weighing platform supported by a load cell, the method including:
    (a) receiving a series of discrete products on the weighing platform and discharging the series of discrete products from the weighing platform, the series of discrete products being conveyed in a conveying direction to and from the weighing platform;
    (b) performing a series of weighing cycles with the scale, each weighing cycle for weighing a set of one or more of the series of discrete products;
    (c) for each respective one of the series of weighing cycles, where a final one of the series of discrete products received on the weighing platform for that respective weighing cycle has been discharged from the weighing platform and the weighing platform is not loaded by a subsequent one of the discrete products in the series of discrete products after the final one of the series of discrete products for that respective weighing cycle, automatically triggering a zeroing function for the scale at an end of that respective weighing cycle; and
    (d) automatically canceling the triggered zeroing function where the subsequent one of the discrete products reaches the weighing platform before the triggered zeroing function has successfully concluded.

2. The method of claim 1 wherein two immediately successive discrete products in the series of discrete products form a gap therebetween and the zeroing function is triggered as soon as a front end of the gap has passed the weighing platform in the conveying direction.

3. The method of claim 1 wherein each discrete product has a leading edge in the conveying direction and a trailing edge in the conveying direction, and the method further comprises:
    (a) conveying a first product in the conveying direction, the first product comprising one of the series of discrete products;
    (b) determining a point in time at which the leading edge or the trailing edge of the first product reaches a target position downstream of the weighing platform in the conveying direction; and
    (c) triggering the zeroing function based on the point in time.

4. The method of claim 3 wherein:
    (a) the point in time is determined by means of a sensor positioned upstream of the weighing platform in the conveying direction, positioned downstream of the weighing platform in the conveying direction, or positioned at an intermediate location along a length of the weighing platform in the conveying direction; and
    (b) the sensor detects at least one of the leading edge of the first product and the trailing edge of the first product for use in determining the point in time.

5. The method of claim 4 wherein the point in time is determined taking into account at least one of the product length of the first product, a conveying speed of the first product, the length of the weighing platform in the conveying direction, and the length of a gap between the first product and a second product that is adjacent to the first product upstream in the conveying direction.

6. The method of claim 4 wherein the sensor is positioned upstream of the weighing platform in the conveying direction and detects the trailing edge of the first product for use in determining the point in time.

7. The method of claim 1 wherein a sensor is positioned upstream of the weighing platform in the conveying direction and further including terminating the triggered zeroing function in response to a detection of a leading edge of the subsequent one of the series of discrete products.

8. The method of claim 1 wherein a sensor is positioned upstream of the weighing platform in the conveying direction and the zeroing function is triggered if the sensor detects a leading edge of a respective one of the series of discrete products and if no previous zeroing function is running at that point in time.

9. The method of claim 1 wherein the triggered zeroing function is activated as a mode in case a zero-tracking function running up to that time can no longer operate.

10. The method of claim 1 wherein a zero-tracking function is performed through a device included in the load cell of the scale and the triggered zeroing function is performed through a control unit formed separately from the load cell.

11. An automatic scale comprising:
(a) a weighing platform operable for receiving a series of discrete products at an upstream side and for discharging the series of discrete products from a downstream side, the series of discrete products being conveyed in a conveying direction, each discrete product in the series of discrete products having a leading edge in the conveying direction and a trailing edge in the conveying direction;
(b) a load cell supporting the weighing platform, the load cell and weighing platform being operable to perform a series of weighing cycles, each weighing cycle for weighing a set of one or more of the series of discrete products; and
(c) a control unit operable for (i) for each respective one of the series of weighing cycles, where a final one of the series of discrete products received at the weighing platform for that respective weighing cycle has left the weighing platform and the weighing platform is not loaded by a subsequent one of the discrete products in the series of discrete products after the final one of the series of discrete products, automatically triggering a zeroing function for the scale at an end of that respective weighing cycle, and for (ii) automatically cancelling the triggered zeroing function where the subsequent one of the discrete products reaches the weighing platform before the triggered zeroing function has successfully concluded.

12. The automatic scale of claim 11 further including at least one sensor for detecting at least one of the leading edge and the trailing edge of one of the series of discrete products conveyed in the conveying direction at a position of the sensor or at a target position spaced apart from the position of the sensor in the conveying direction.

13. The automatic scale of claim 12 wherein the target position is downstream of the weighing platform in the conveying direction.

14. The automatic scale of claim 13 wherein the control unit is operable to determine a point in time at which the leading edge or the trailing edge of one of the series of discrete products reaches the target position and triggering the zeroing function is based on the point in time.

15. The automatic scale of claim 12 wherein the control unit is operable to determine a point in time at which the leading edge or the trailing edge of one of the series of discrete products reaches the target position.

16. The automatic scale of claim 11 wherein the control unit is operable to at least one of (i) receive and process signals from at least one sensor, and (ii) control a conveying device associated with the weighing platform, and (iii) perform the zeroing function.

17. The automatic scale of claim 11 wherein the control unit is formed separately from the load cell.

* * * * *